United States Patent
Mizuno et al.

(10) Patent No.: US 7,411,947 B2
(45) Date of Patent: Aug. 12, 2008

(54) STORAGE SYSTEM, COMPUTER SYSTEM AND INTERFACE MODULE

(75) Inventors: Makio Mizuno, Sagamihara (JP); Akira Fujibayashi, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 360 days.

(21) Appl. No.: 10/893,912

(22) Filed: Jul. 20, 2004

(65) Prior Publication Data

US 2005/0265377 A1    Dec. 1, 2005

(30) Foreign Application Priority Data

May 28, 2004    (JP)    ............................ 2004-159093

(51) Int. Cl.
- *H04L 12/50* (2006.01)
- *H04L 12/66* (2006.01)
- *H04J 3/22* (2006.01)
- *H04J 14/02* (2006.01)

(52) U.S. Cl. ................. 370/366; 370/401; 370/463; 370/466; 398/47; 398/75

(58) Field of Classification Search .......... 370/401, 370/447, 366–357, 395.5, 463, 466; 398/47, 398/75

See application file for complete search history.

(56) References Cited

U.S. PATENT DOCUMENTS

| | | | | |
|---|---|---|---|---|
| 6,564,039 | B1* | 5/2003 | Meador et al. | 455/76 |
| 6,624,770 | B1* | 9/2003 | Tsai et al. | 341/102 |
| 6,654,830 | B1* | 11/2003 | Taylor et al. | 710/74 |
| 6,802,021 | B1* | 10/2004 | Cheng et al. | 714/4 |
| 2002/0194415 | A1* | 12/2002 | Lindsay et al. | 710/305 |
| 2003/0093541 | A1 | 5/2003 | Lolayekar et al. | |
| 2003/0120791 | A1* | 6/2003 | Weber et al. | 709/231 |
| 2003/0235204 | A1 | 12/2003 | Azevedo et al. | |
| 2004/0202205 | A1* | 10/2004 | Sheth et al. | 370/539 |
| 2005/0066045 | A1* | 3/2005 | Johnson et al. | 709/230 |

FOREIGN PATENT DOCUMENTS

| | | |
|---|---|---|
| JP | 2002-318782 | 10/2002 |
| WO | WO 01/59966 A1 | 8/2001 |
| WO | 2002-318782 | 10/2002 |
| WO | WO 2005/024557 A | 3/2005 |

* cited by examiner

*Primary Examiner*—Alpus H Hsu
(74) *Attorney, Agent, or Firm*—Mattingly, Stanger, Malur & Brundidge, PC

(57) ABSTRACT

An interface module comprises a serial signal transceiver to be connected to an external transmission path and an interface processing unit connected to the transceiver. The interface processing unit comprises a serializer/deserializer circuit, an encoder/decoder, a protocol processing unit having at least two kinds of selectable protocol processing functions, and a communicate mode switch circuit for changing reference clock to be supplied to the serializer/deserializer circuit in conjunction with switching of the protocol processing function from one to another.

4 Claims, 6 Drawing Sheets

STORAGE SYSTEM, COMPUTER SYSTEM AND INTERFACE MODULE

CLAIM OF PRIORITY

The present application claims priority from Japanese application serial no. 2004-159093, filed on May 28, 2004, the content of which is hereby incorporated by reference into this application.

BACKGROUND OF THE INVENTION

The present invention relates to a storage system, computer system and interface module and, more particularly, to a storage system, computer system, and interface module enabling switching across communication protocols for communicating with external devices.

FC-SAN using Fibre Channel (FC) nowadays prevails as a data transmission protocol for realizing Storage Area Networks (SANs). The Fibre Channel has performance of gigabits class to enable high-speed data transfer, and can be used for long-range connection by using optical fibers. Further, the Fibre Channel enables consolidating the management of storage systems associated with servers, making use of its feature that it can construct a network by employing interconnect devices such as switches.

Recently, a new storage networking technology based on an Internet Protocol (IP) has come out. Ethernet (a registered trademark), which has lagged behind the Fibre Channel in transfer performance, has succeeded in realizing Gigabit Ethernet with a data transfer rate that is made higher by applying the Fibre Channel's physical layer and data encoding mechanism that enable data transfer of gigabits class. Consequently, Ethernet now has a position competitive with the Fibre Channel in the storage networking field. The IP based storage networking technology is called an IP-SAN in distinction from the FC-SAN based on the Fibre Channel.

Turning to storage systems, on the other hand, lately, competitive vendors have keenly competed with each other in developing storage management solutions with higher functionality in addition to competing in terms of higher performance, larger capacity, and lower cost. Moreover, a variety of interfaces for connecting a storage system with computers (hereinafter referred to as hosts or servers) have been used. As the interfaces for connection with hosts, there exists ESCON and FICON which are main frame channel interfaces and Fibre Channel and Ethernet which are the above-mentioned open systems. For the storage systems, connectivity with servers is an important factor and plural kinds of module boards corresponding to the kinds of interfaces are prepared so that the storage systems can adapt to the above variety of interfaces.

The Fibre Channel and the Gigabit Ethernet operate at different data transmission rates in bits per second; Fibre Channel operates at 1.0625 Gbps, and Gigabit Ethernet operates at 1.25 Gbps. Now, the Fibre Channel has achieved a transmission rate of 2 Gbps. Bus adapters of switch and host are made to automatically correspond to a 1-Gbps (exactly, 1.0625 Gbps) Fibre Channel and a 2-Gbps Fibre Channel by detecting the transmission rate. This function of automatically detecting the channel transmission rate is generally called an auto-negotiation.

Although the data transmission rates of the Fibre Channel and the Gigabit Ethernet differ as described above, both the Fibre Channel and the Gigabit Ethernet use the same frequency of 106.25 MHz as a basic frequency of clocks for data acquisition timing. Moreover, the Fibre Channel adopts a method called a double data rate which acquires data at the rising and falling edges of each clock for 1 Gbps.

As one of prior art documents relevant to these technologies, for example, there is a JP-A No. 2002-318782.

SUMMARY OF THE INVENTION

In order to accommodate the above-mentioned variety of connection interfaces in the field of computer network and storage network, a plurality of kinds of circuit boards need to be developed in accordance with communication protocols, as interface modules of a storage control unit in a storage system. Therefore, storage manufacturers have a problem of increased developing cost and management cost for the interface modules. On the user side, there is a problem of an increase in the installation cost, because users have to purchase individual module boards according to the kinds of interface protocols that the users need.

By the way, because the Fibre Channel and the Gigabit Ethernet taking advantage of the Fibre Channel have many similarities in the physical layer and data encoding part, as described above, it is possible to integrate these two kinds of interfaces on the same module board. However, because the Fibre Channel and the Gigabit Ethernet operates at the different data transmission rates in bits per second, if the Fibre Channel interface and Gigabit Ethernet interface should be unified, an interface processing unit of the storage system needs to have a mechanism for transmitting and receiving data in accordance with respective transmission rates.

One embodiment of an interface module according to the present invention is configured to solve the above-noted problem as follows. Concretely, the interface module performs protocol processing for a plurality of selectable protocols and changes the reference clock essential for the interface module operations in response to an instruction to switch the protocol processing from one to another.

More specifically, the interface module comprises a serial signal transceiver connected to an external transmission path and an interface processing unit connected to the transceiver. The interface processing unit comprises a serializer/deserializer circuit for converting serial signals received from the transceiver into parallel signals and for converting parallel signals to be transmitted to the external transmission path into serial signals to output the serial signals to the transceiver, an encoder/decoder connected to the serializer/deserializer circuit, a protocol processing unit connected to the encoder/decoder for selectively performing at least two kinds of protocol processing, and a communicate mode switch for switching reference clock to be supplied to the serializer/deserializer circuit from one to another in conjunction with the switching of protocol processing.

Concretely speaking, the protocol processing unit comprises, for example, a first protocol processing part for Fibre Channel and a second protocol processing part for Gigabit Ethernet. The communicate mode switch supplies a 106.25 MHz clock to the serializer/deserializer circuit when the first protocol processing part is selected and supplies a 125 MHz clock to the serializer/deserializer circuit when the second protocol processing part is selected.

According to another embodiment, the interface module comprises at least two serial signal transceivers each connected to an external transmission path, and a selector for selectively connecting one of the serial signal transceivers to the interface processing unit. The communicate mode switch performs switching between the above protocol processing parts and switching between the above reference clocks in conjunction with or independently of the selection of one of the transceivers by the selector.

As an embodiment of a storage system to solve the above-noted problem, at least one of a plurality of interface modules for connection with an external device includes the above interface processing unit capable of switching the protocol processing from one to another. Thereby, the storage system can perform data transfer to and from a host computer or another device by an optimal communication protocol through the same I/O port.

Furthermore, as an embodiment of a computer system to solve the above-noted problem, the computer system is configured to have a host computer, a storage control unit which communicate with the host computer through a transmission path, and a management console connected to the host computer and the storage control unit. Each of the computer and the storage system has an interface module comprising a serial signal transceiver connected to the transmission path and an interface processing unit connected to the serial signal transceiver. The interface processing unit includes a protocol processing unit which selectively performs at least two kinds of above-mentioned protocol processing, and a communicate mode switch. The communicate mode switch performs switching between the above protocol processing parts and switching between the clocks in response to an instruction from the management console.

As another embodiment, the computer system comprises a host computer, a first storage control unit connected to the host computer through a first transmission path, and a second storage control unit connected to the first storage control unit through a second transmission path. The first storage control unit includes an interface module which comprises a first serial signal transceiver to be connected to the first transmission path, a second serial transceiver to be connected to the second transmission path, an interface processing unit, and a selector to selectively connect one of the first and second serial signal transceivers to the interface processing unit. The interface processing unit comprises the above serializer/deserializer circuit, the encoder/decoder, the protocol processing unit which performs the first and second protocol processing selectively, and the communicate mode switch.

DESCRIPTION OF THE PREFERRED EMBODIMENTS

Preferred embodiments of the present invention will be described hereinafter with reference to the accompanying drawings.

Figure 1:
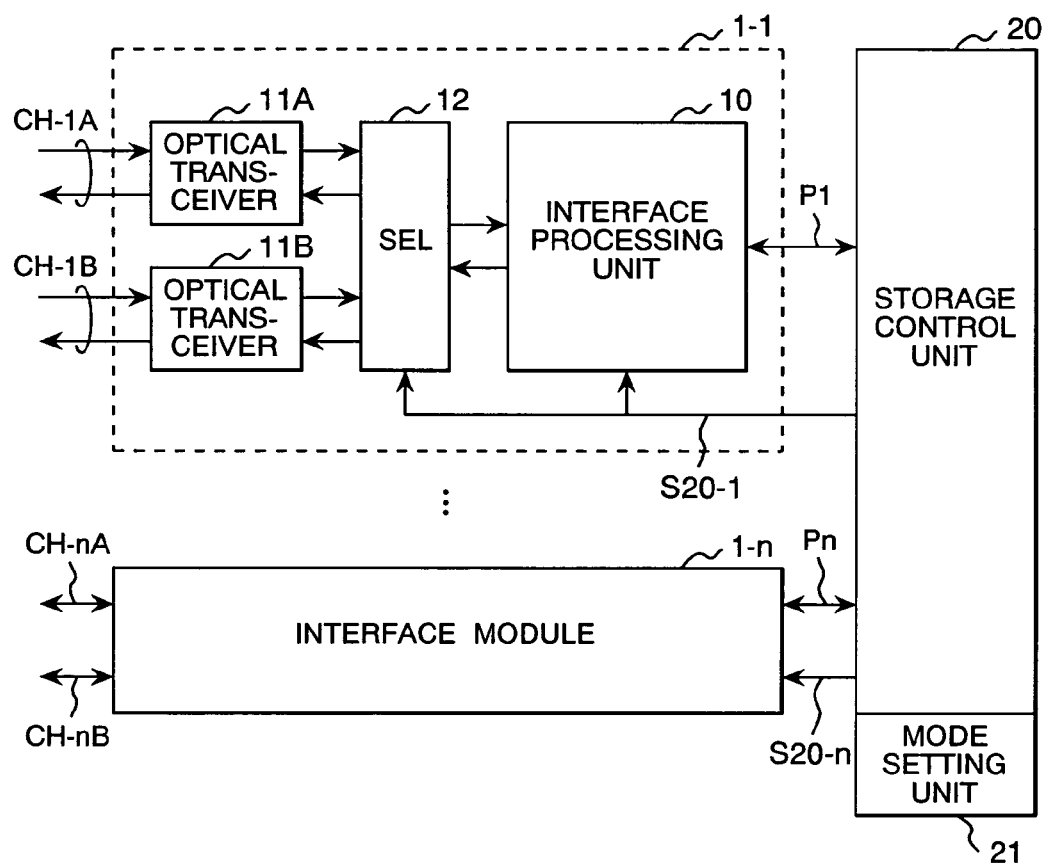
FIG. 1 is a block diagram of the main part of a storage system according to an embodiment of the present invention.

FIG. 1 is a block diagram of the main part of a storage system according to an embodiment of the present invention.

The storage system is comprised of a storage control unit 20, interface modules 1-$i$ (i=1 to n) each of which is connectable to two kinds of transmission paths CH-iA, CH-iB having different communication protocol to each other, and a plurality of storage units (not shown) which are controlled by the storage control unit 20. Each interface module 1-$i$ includes an interface processing unit 10 having signal processing function corresponding to the physical layer and data link layer of the OSI model. The interface modules 1-$i$ may be built-in the storage control unit 20 or may be installed outside the storage control unit 20.

Each interface module 1-$i$ is comprised of an optical transceiver (serial signal transceiver) 11A connected to an optical fiber to be a first transmission path CH-iA, an optical transceiver 11B connected to an optical fiber to be a second transmission path CH-iB, and a selector (SEL) 12 which selectively connects one of the optical transceivers to the interface processing unit 10. The selector 12 is controlled by a communicate mode switch control signal S20$i$ (i=1 to n) output from the storage control unit 20.

Using a selector control signal S20-$i$, the storage control unit 20 can instruct the selector to select the first transmission path CH-iA or the second transmission path CH-iB for each port (interface module), based on communicate mode selection information set to a mode setting unit 21 in the storage control unit 20. The communicate mode selection information may be set automatically from a control program running in the storage control unit or set in response to a command issued from an external management console to the control program.

In the following description of the embodiment, it is assumed that the communication protocol of the first transmission path CH-iA is Fibre Channel (FC) and the communication protocol of the second transmission path CH-iB is Gigabit Ethernet. However, by supplying the interface processing unit 10 with a control signal independent from the control signal that is supplied to the selector 12, for example, it is also possible under the same protocol to switch the communication counterpart of the storage control unit 20 from a device connected to the first transmission path to another device connected to the second transmission path.

While, in FIG. 1, all interface modules 1-$i$ (i=1 to n) connected to the I/O ports (I/O signal lines) P1 to Pn of the storage control unit 20 are configured to have two serial signal transceivers 11A and 11B, part of the interface modules may be configured to have a single serial signal transceiver and dispense with the selector 12. In this case, by switching the communicate mode with the control signal S20-$i$, the same transmission path is used in a time division manner as either the path for Fibre Channel or the path for Gigabit Ethernet and a communication protocol function of the interface processing unit 10 performs Fibre Channel protocol processing and Gigabit Ethernet protocol processing in a time division manner.

Figure 2:
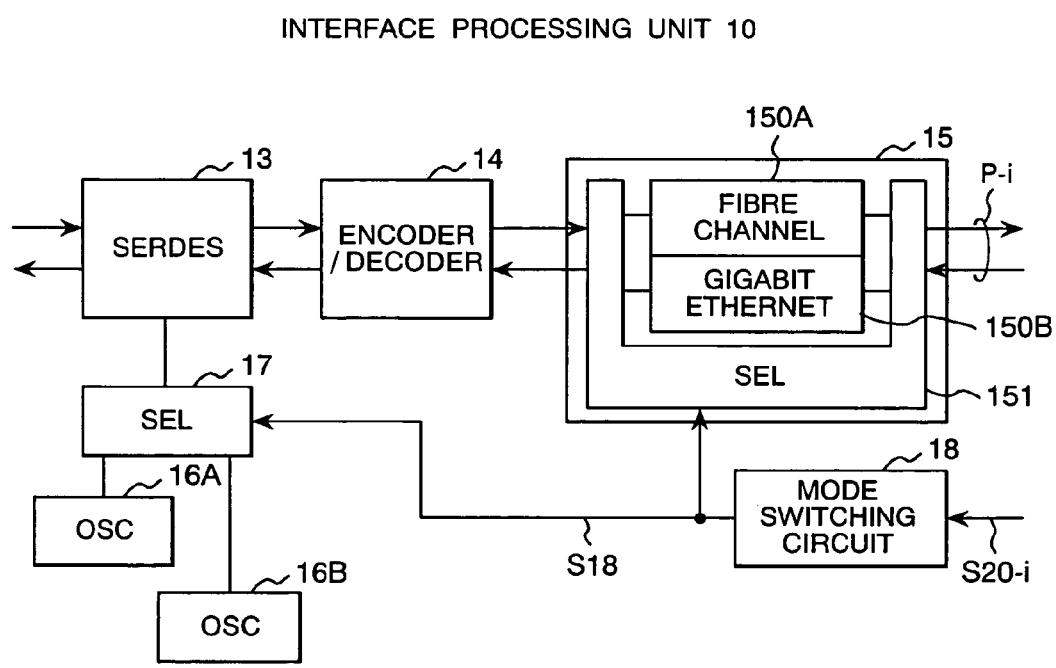
FIG. 2 is a diagram showing an example of the interface processing unit.

FIG. 2 shows an embodiment of the interface processing unit 10.

The interface processing unit 10 is comprised of a serializer/deserializer (SERDES) 13 connected to the selector 12 shown in FIG. 1, a data encoder/decoder 14 connected to the SERDES 13, a protocol processing unit 15 connected to the encoder/decoder 14, two oscillators 16A, 16B which are selectively connected to the SERDES 13 via a selector 17, and a mode switching circuit 18. The protocol processing unit 15 is comprised of a Fibre Channel protocol processing function part 150A and a Gigabit Ethernet protocol processing function part 150B. One of the function parts selected by a selector 151 performs predetermined protocol processing operation between the encoder/decoder 14 and the storage control unit 20.

The SERDES 13 is connected to either the optical transceiver 11A or 11B selected by the selector 12. The optical transceiver 11A or 11B converts optical signals received from the transmission path CH-iA or CH-iB into electrical signals and converts transmission signals supplied as electrical signals from the SERDES 13 into optical signals to transmit the optical signals over the transmission path.

Each of the Fibre Channel transmission path CH-iA and the Gigabit Ethernet transmission path CH-iB forms a serial interface for transmitting data bit by bit. However, because the storage control unit 20 processes data in a parallel form, the interface processing unit 10 needs to have a function of making conversion between serial data and parallel data. The SERDES 13 converts serial data received from the optical transceiver 11A or 11B into parallel data to output the parallel data to the encoder/decoder 14 and converts parallel data supplied from the encoder/decoder 14 into serial data to output the serial data to the optical transceiver 11A or 11B.

The encoder/decoder 14 decodes parallel data received from the SERDES 13 to transfer the decoded data to the protocol processing unit 15, and encodes parallel data supplied from the protocol processing unit 15 to output the encoded data to the SERDES 13. For both the Fibre Channel and Gigabit Ethernet, transmission signals in the physical layer are encoded by an encoding method named 8B/10B developed by IBM Corporation. According to the 8B/10B encoding, a receiving-end device can extract clock signals from received signals and restore transmission data based on the clock signals.

Actual transmission rates of 8B/10B encoded signals differ between the Fiber Channel and Gigabit Ethernet. Specifically, for the transmission rate of the Fibre Channel, a maximum throughput is selected so as to be an integer multiple of 100 MB/s. To achieve the transmission rate of 100 MB/s, the Fibre Channel estimates a data transmission rate at 0.85 Gbps, taking account of overheads occurring, and adopts a throughput rate of 1.0625 Gbps obtained when 8B/10B encoding is performed on a signal having the transmission rate. On the other hand, the Gigabit Ethernet adopts a throughput rate of 1.25 Gbps obtained when 8B/10B encoding is performed on a signal having a data transmission rate of 1 Gbps.

In the SERDES 13, a circuit to extract bit values and clock signals to synchronize the bits from the serial received signals is called a clock and data restoration circuit (CDR). The CDR extracts synchronous clocks, using a clock signal having an internal reference frequency in the interface processing unit 10.

Because the data transmission rates differ between the Fiber Channel and Gigabit Ethernet as described above, in the present embodiment, the clock oscillator 16A with a reference frequency of 106.25 MHz for Fibre Channel and the clock oscillator 16B with a reference frequency 125 MHz for Gigabit Ethernet are prepared and clock frequency to be supplied to the SERDES 13 is switched by the selector 17.

Switching between the above clock frequencies is triggered by an output signal S18 from the mode switching circuit 18. Using the output signal S18, the mode switching circuit 18 directs the selector 17 to select the oscillator 16A for Fibre Channel when the control signal S20-i makes the selector 12 select the optical transceiver 11A for the transmission path CH-1A and directs the selector 17 to select the oscillator 16B for Gigabit Ethernet when the control signal S20 makes the selector 12 select the optical transceiver 11B for the transmission path CH-1B.

The selector 151 in the protocol processing unit 15 is also controlled by the output signal S18 from the above mode switching circuit 18 to activate either the Fibre Channel protocol processing part 150A or Gigabit Ethernet protocol processing part 150B. The protocol processing parts 150A and 150B may be prepared as software which is executed by a microprocessor composing the protocol processing unit 15 or may be prepared as dedicated LSIs.

For the Gigabit Ethernet, after the advent of a TCP/IP Offload Engine (TOE) which achieved enhanced processing efficiency through hardware-implemented protocol processing of TCP/IP, which was performed by firmware before that, most of protocol processing chips are equipped with TOEs. An LSI equipped with this TOE may be applied to the protocol processing part 150B for Gigabit Ethernet.

In the protocol processing unit 15, either the protocol processing part 150A or 150B selected by the signal S18 performs protocol processing on the data received from the encoder/decoder 14 and then transfers the received data to the storage control unit 20. Also, either the part 150A or 150B performs protocol processing on transmission data received from the storage control unit 20 and outputs the transmission data to the encoder/decoder 14.

While, in the interface module configuration shown in FIG. 1, the selector 12 for selecting one of the optical transceivers is installed outside the interface processing unit 10, the selector 12 may be built-in the interface processing unit 10 so as to be controlled by the output signal S18 from the mode switching circuit 18. In this case, the mode switching circuit 18 may be embodied in a manually switchable type such as a dip switch so that path switching may be performed manually for each interface module instead of supplying the switch control signal S20 from the storage control unit 20.

As described above, according to the present embodiment, the Fibre Channel protocol processing part 150A and the Gigabit Ethernet protocol processing part 150B are prepared in the interface processing unit 15 and the reference clock oscillator 16A for Fibre Channel and the reference clock oscillator 16B for Gigabit Ethernet are prepared as the reference clock sources for the SERDES 13, so that the interface module can make the connection to either of the transmission paths of different communication protocols (communication modes) by switching between the reference clock frequencies and switching between the protocol processing parts by the control signal S20.

To prevent inconsistency between the operations of the interface module and the storage control unit 20, programs to be executed in the storage control unit 20 may be switched from one to another in conjunction with switching between the above communication protocols (communication modes)

Figure 3:
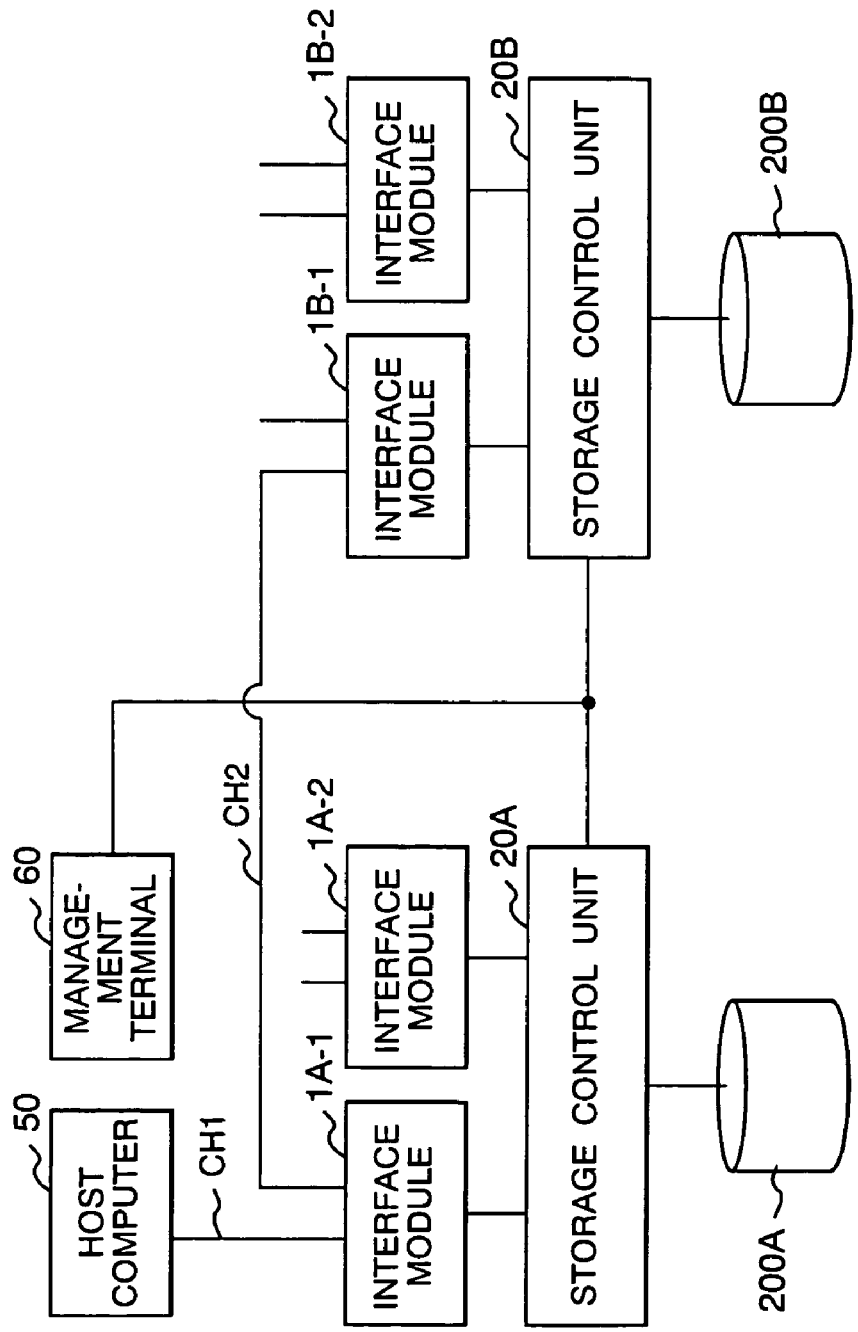
FIG. 3 is a diagram showing one embodiment of a computer system of the present invention.

FIG. 3 shows, as an example of the computer system of the present invention, a computer system comprising a data center and a mirror site for data backup.

The data center is comprised of a host computer 50, a management terminal 60, and a storage system comprised of a storage control unit 20A, storage 200A, and interface modules 1A-1 and 1A-2. The host computer 50 is connected to the interface module 1A-1 through a Fibre Channel transmission path CH1. On the other hand, in the mirror site, a storage system is comprised of a storage control unit 20B, storage 200B, and interface modules 1B-1 and 1B-2.

In such a computer system having the data center and the mirror site, if it is required to connect the storage control units 20A and 20B by Gigabit Ethernet, for example, iSCSI, an interface module or a port dedicated to Gigabit Ethernet (iSCSI) has to be prepared in the prior art. This configuration poses such a problem that one of the I/O ports of the storage control unit 20A had to be occupied by the interface for data backup.

On the other hand, according to the present embodiment, the storage control unit 20B can be connected to the interface module 1A-1 of the storage control unit 20A through a Gigabit Ethernet transmission path CH2 provided by the interface module 1B-1. Accordingly, it is possible to use the same interface module 1A-1 for host computer connection and for data backup in a time division manner by switching the communication mode of the interface module 1A-1 from one to another with a control command issued from the management terminal 60 to the storage control unit 20A.

Specifically, it is preferable to schedule the interface module 1A-1 to operate in Fibre Channel mode during a certain time zone (daytime) when application programs are executed on the host computer and to switch the communicate mode of the interface module 1A-1 to Gigabit Ethernet mode during a certain time zone (nighttime) when the application programs are out of service, so that data stored in the storage 200A can be transferred (copied) as backup data to the storage 200B.

Although the storage control units 20A and 20B are connected via the interface module 1A-1 in FIG. 3, another Gigabit Ethernet (iSCSI) transmission path provided by another interface module 1A-2 may be used to connect the storage control units 20A and 20B. In this case, the same port (interface module 1A-2) is shared by a device (not shown) connected to a Fibre Channel transmission path provided by the interface module 1A-2 and the storage control unit 20B in a time division manner.

Figure 6:
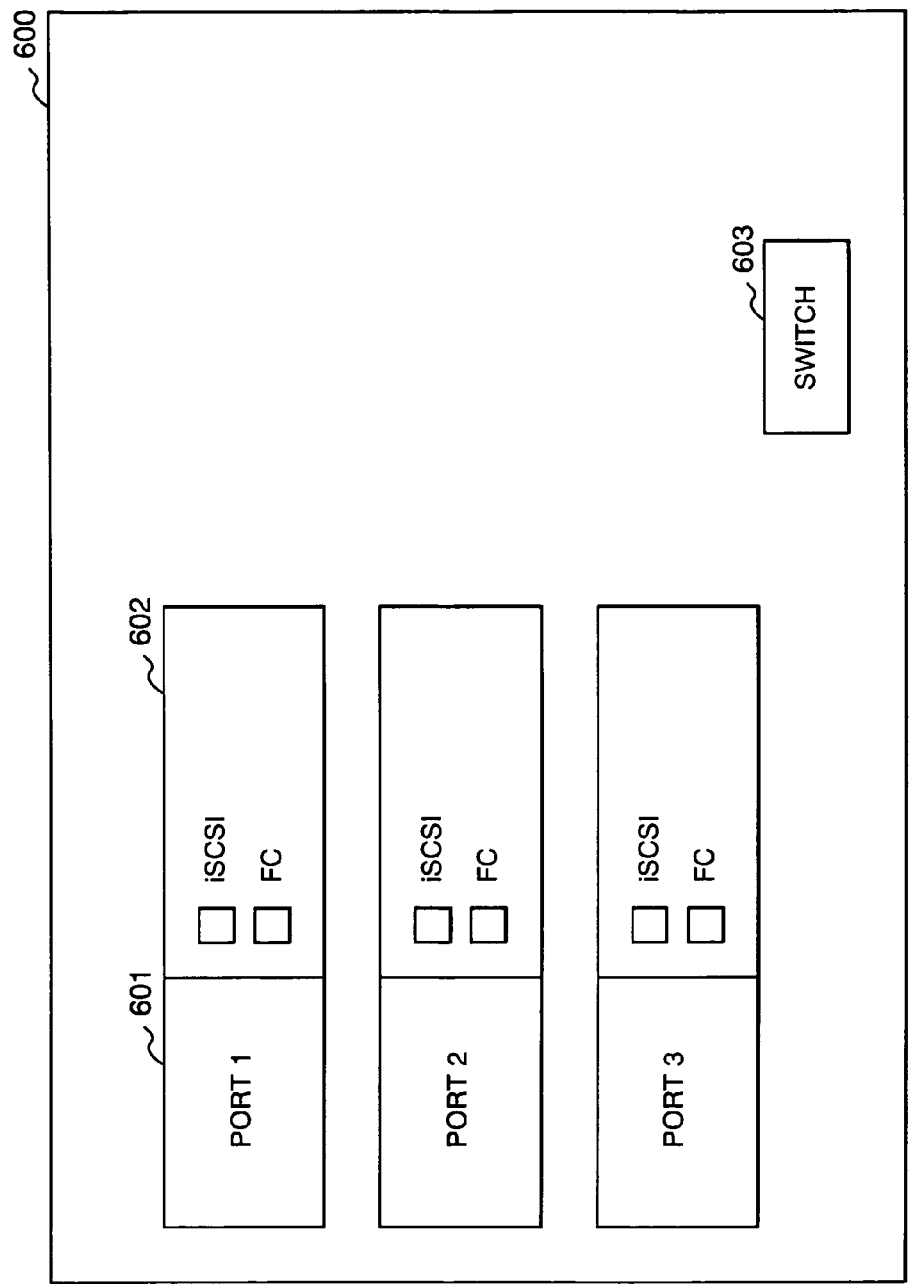
FIG. 6 is an example of a screen displayed on a management console.

The interface module communicate mode switching maybe controlled from the management terminal 60, using a display screen, for example, like the one that is shown in FIG. 6. On the display screen of the management terminal 60, a control window 600 for allowing an administrator to specify interface communicate mode is created. The window 600 includes communicate mode selection boxes 602 for each of the identifiers 601 of the interface modules (connection ports) of the storage control units 20A and 20B. After selecting one of the protocol option buttons prepared in each of the communicate mode select boxes, the administrator clicks a switch command button 603 prepared in the control window, then a mode switch command specifying interface identifier(s) and selected communicate mode per port is issued to the storage control unit 20A or 20B. In this case, by changing the visual states of the option buttons in the selection boxes in response to the selection of the button, the present communicate mode settings of the interface modules can be distinguished readily.

Figure 4:
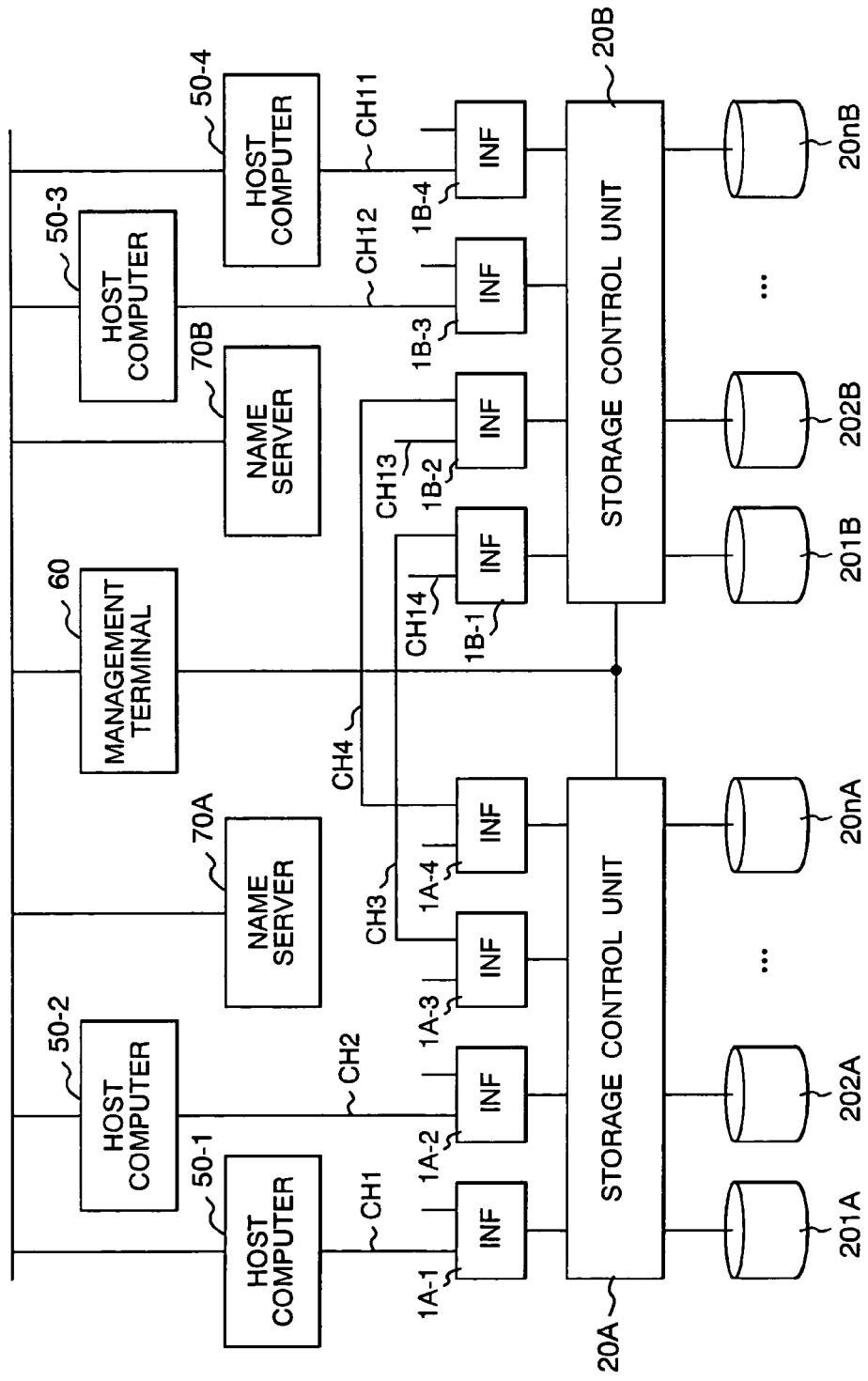
FIG. 4 is a diagram showing another embodiment of a computer system of the present invention.

FIG. 4 shows a computer system comprising a primary site computer system and a secondary site computer system, taking disaster recovery into consideration, as another application example of the storage system of the present invention.

The primary site computer system is comprised of host computers 50-1, 50-2, a storage control unit 20A accommodating storage units 201A to 20nA, and a name server 70A. The host computers 50-1, 50-2 are connected to interface modules (INFs) 1A-1, 1A-2 of the storage control unit 20A through Fibre Channel transmission paths CH1, CH2, respectively. The name server 70A manages device identifiers such as the identifiers of the host computers and storage control unit under the control.

The secondary site computer system is comprised of host computers 50-3, 50-4, a storage control unit 20B accommodating storage units 201B to 20nB, and a name server 70B. The host computers 50-3, 50-4 are connected to interface modules (INFs) 1B-3, 1B-4 of the storage control unit 20B through Fibre Channel transmission paths CH11, CH12, respectively.

The storage control units 20A and 20B are connected through a Gigabit Ethernet (iSCSI) transmission path CH3 between the interface modules 1A-3 and 1B-1 and through a Gigabit Ethernet transmission path CH4 between the interface modules 1A-4 and 1B-2. While the interface modules 1A-1, 1A-2 (1B-3, 1B-4) for the connections to the host computers are separate from the interface modules 1A-3, 1A-4 (1B-1, 1B-2) for the connection between the storage control units in FIG. 4, an interface module may be shared for both the connection to a host computer and the connection between the storage control units as is the case for FIG. 3.

In such a computer system, it has heretofore been necessary for the storage control unit 20A (20B) in each site to prepare a plurality of ports 1A-3, 1A-4 (1B-1, 1B-2) dedicated to disaster recover separately from the ports 1A-1, 1A-2 (1B-3, 1B-4) for the connections to the host computers. Therefore, for example, when the primary site fails down by a failure occurring and the secondary site system starts to operate, among the ports of the storage control unit 20-B in the secondary site, the ports for the connection to the primary site (interface modules 1B-1. 1B2 in FIG. 4) are placed in unserviceable states, which posed a problem that some of the resources are made idle.

However, according to the present application example, since the interface modules 1B-1, 1B-2 of the storage control unit 20-B have two switchable transmission path interfaces (optical transceivers 11A, 11B), respectively, it is possible to use the interface modules 1B-1, 1B-2 as the ports for connection to a device other than the storage control unit 20A by switching the communicate mode of the interface modules from one to another with the control command issued from the management terminal 60.

Device identifier registration to and deregistration from the name server 70B may be performed in conjunction with the above-described interface module communicate mode switching operation. For example, in the case where the name server 70B manages iSCSI names, when communicate mode of an interface module 1B is switched to Ethernet iSCSI, a command to register an iSCSI name corresponding to the interface module 1B to be switched is issued from the management terminal 060 to the name server 70. Conversely, when the communicate mode of the interface module 1B is switched from Ethernet to Fibre Channel, a command to delete or stop to use the iSCSI name of the interface module 1B is issued from the management terminal 60 to the name server 70B.

Figure 5:
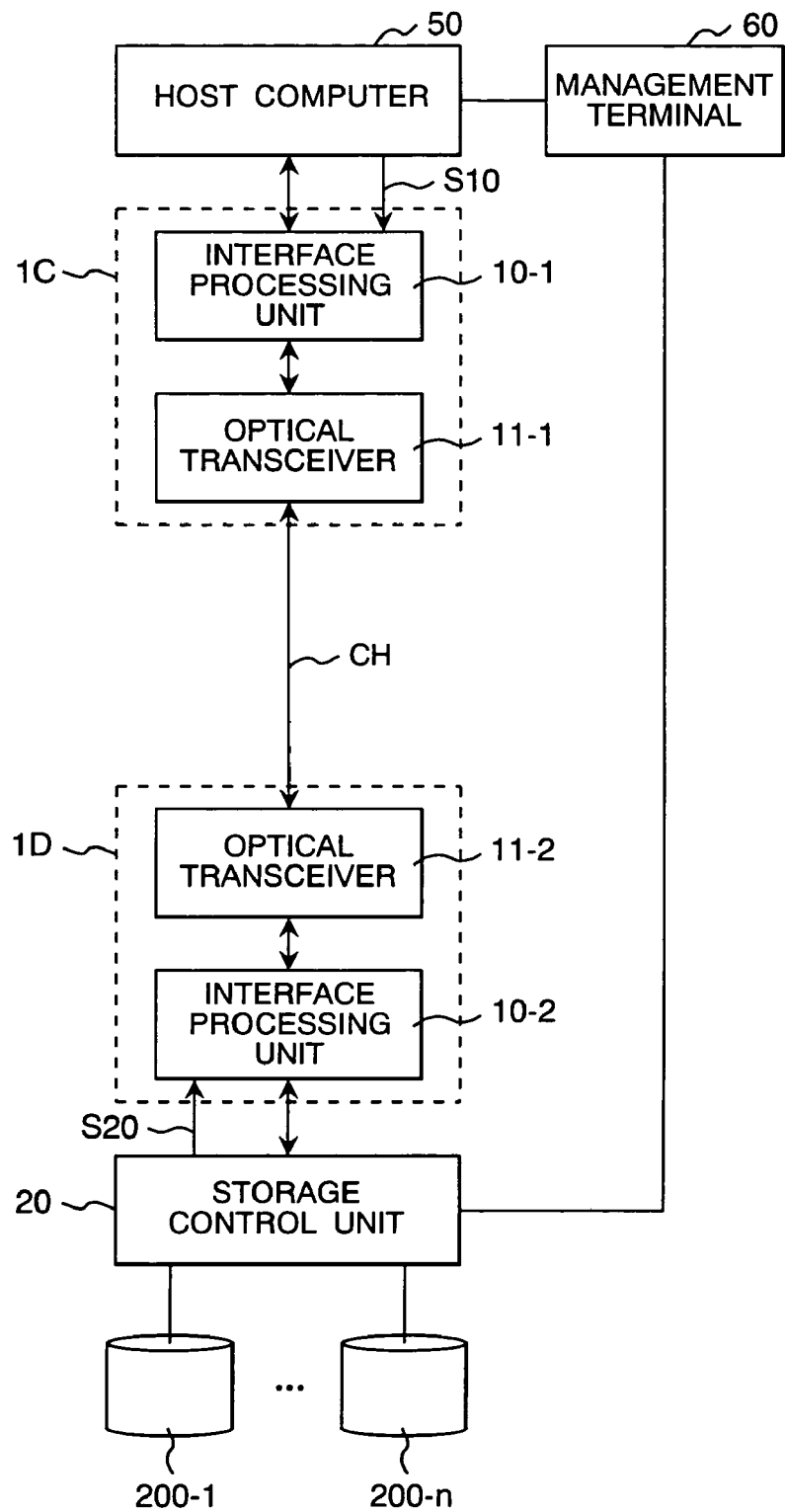
FIG. 5 is a diagram showing still another embodiment of a computer system of the present invention.

FIG. 5 shows a still another embodiment of the computer system of the present invention.

A feature of the present embodiment resides in that both a host computer 50 and a storage control unit 20 are provided with the above-described interface modules 1C, 1D, respectively, and the communication protocols between the host computer 50 and the storage control unit 20 can be switched with a command from a management terminal 60.

The interface module 1C is composed of an interface processing unit 10-1 configured as shown in FIG. 2 and an optical transceiver 11-1. The communicate mode (Fibre Channel and Gigabit Ethernet) of the interface processing unit 10-1 is switched with a-control signal S10 output from the host computer. The interface module 1D is comprised of an interface processing unit 10-2 configured as shown in FIG. 2 and an optical transceiver 11-2. The communicate mode of the interface processing unit 10-2 is switched with a control signal S20 output from the storage control unit 20. The host computer 50 and the storage control unit 20 issue the communicate mode switch control signals S10, S20 to the interface processing units 10-1, 10-2, respectively, while synchronizing with each other in response to a command from the management terminal 60.

According to the present embodiment, the communication protocol between the host computer 50 and the storage control unit 20 can be optimized by switching the protocol of the transmission path CH according to the kind of an operation system (OS) running on the host computer 50.

Although, in the above-described embodiments, system configurations where the storage system (storage control unit 20) and the host computer are connected by the transmission path CH or CH1 are presented, the interface modules are applicable to storage systems connected to a storage network.

According to the above-described interface modules that are capable of switching the communication protocol from one to another, it is possible to configure a storage system and computer system where device-to-device communication protocol is optimized without exchanging the interface modules. Further, because a single interface module is adaptable to a plurality of kinds of communication protocols, a storage system and computer system that make effective use of a limited number of I/O ports can be constructed by equipping each interface module with a plurality of selectable transceivers.

We claim:

1. An interface module for connecting a computer system element to a first external transmission path and a second external transmission path, comprising:
   a first signal transceiver to be connected to said first external transmission path;
   a second signal transceiver to be connected to said second external transmission path;
   an interface processing unit; and
   a selector for selectively connecting one of said serial signal transceivers to said interface processing unit,
   wherein said interface processing unit comprises:
   a serializer/deserializer circuit to convert serial signals received from said serial signal transceivers into parallel signals, convert parallel signals to be transmitted to said external transmission paths into serial signals and output the serial signals to one of said serial signal transceivers;
   an encoder/decoder connected to said serializer/deserializer circuit; and
   a protocol processing unit which is connected to said encoder/decoder for selectively performing at least two kinds of protocol processing,
   wherein said selector selects one of said serial signal transceivers to be connected to said interface processing unit based on a given instruction issued from said computer system element,
   wherein said interface unit switches reference clock to be supplied to said serializer/deserializer circuit from one to another based on said given instruction,
   wherein said computer system element is a first storage control unit, said first signal transceiver is connected to a host unit via said first external transmission path, and said second signal transceiver is connected to a second storage control unit via said second external transmission path,
   wherein said given instruction is issued so that said first storage control unit is connected to one of said host unit and second storage control unit in a time division manner, and
   wherein said protocol processing unit further comprises:
   a first protocol processing part for Fibre Channel; and
   a second protocol processing part for Gigabit Ethernet,
   wherein, if said given instruction specifies protocol processing for the Fibre Channel, said selector selects said first serial signal transceiver for transmitting and receiving packets according to the Fibre Channel protocol and said interface processing unit directs said protocol processing unit to select said first protocol processing part and supplies a clock with 106.25 MHz to said serializer/deserializer circuit,
   if said given instruction specifies protocol processing for the Gigabit Ethernet, said selector selects said second serial signal transceiver for transmitting and receiving packets according to the Gigabit Ethernet protocol and said interface processing unit directs said protocol processing unit to select said second protocol processing part and supplies a clock with 125 MHz to said serializer/deserializer circuit.

2. A storage system, comprising:
   a plurality of interface modules for connection to a plurality of external devices;
   a storage control unit connected to said plurality of interface modules; and
   at least one storage device connected to said storage control unit,
   wherein at least one of said plurality of interface modules comprises:
   a first serial signal transceiver to be connected to a first external device via a first transmission path; and
   a second serial signal transceiver to be connected to a second external device via a second transmission path;
   an interface processing unit; and
   a selector for selectively connecting one of said first and second serial signal transceivers,
   wherein said interface processing unit comprises:
   a serializer/deserializer circuit to convert serial signals received from one of said first and second serial signal transceivers into parallel signals, convert parallel signals to be transmitted to one of said first and second external devices into serial signals and output the serial signals to one of said first and second transceivers;
   an encoder/decoder connected to said serializer/deserializer circuit, and
   a protocol processing unit connected to said encoder/decoder for selectively performing at least two kinds of protocol processing,
   wherein said interface processing unit switches reference clock to be supplied to said serializer/deserializer circuit from one to another and switches the kind of protocol processing to be performed by said protocol processing unit from one to another based on an instruction issued from said storage control unit, and
   wherein said protocol processing unit further comprises:
   a first protocol processing part for Fibre Channel; and
   a second protocol processing part for Gigabit Ethernet,
   wherein, if the instruction of said storage control unit specifies protocol processing for the Fibre Channel, said interface processing unit directs said protocol processing unit to select said first protocol processing part and supplies a clock with 106.25 MHz to said serializer/deserializer circuit,
   if the instruction of said storage control unit specifies protocol processing for the Gigabit Ethernet, said interface processing unit directs said protocol processing unit to select said second protocol processing part and supplies a clock with 125 MHz to said serializer/deserializer circuit.

3. The storage system according to claim 2, wherein said storage control unit has a memory storing communicate mode setting information, and
said storage control unit generates said instruction according to said communicate mode setting information.

4. A computer system, comprising:
a computer;
a storage system communicating with said computer through a transmission path; and
a management console connected to said computer and said storage system,
wherein each of said computer and said storage system has ate least one interface module which is comprised of:
a serial signal transceiver connected to said transmission path; and
an interface processing unit connected to said serial signal transceiver,
wherein said interface processing unit comprises:
a serializer/deserializer circuit to convert serial signals received from said serial signal transceiver into parallel signals, convert parallel signals to be transmitted to said transmission path into serial signals and output the serial signals to said transceiver;
an encoder/decoder connected to said serializer/deserializer circuit, and
a protocol processing unit connected to said encoder/decoder for selectively performing at least two kinds of protocol processing,
wherein each of the interface processing units of both said computer and said storage system switches reference clock to be supplied to said serializer/deserializer circuit from one to another and switches the kind of protocol processing to be performed by said protocol processing unit from one to another in accordance with a control signal generated by said computer or said storage system in response to an instruction from said management console,
wherein the instruction is issued by said management console so as to optimize the protocol of said transmission path in accordance with the kind of operating system running on said computer, and
wherein said protocol processing unit further comprises:
a first protocol processing part for Fibre Channel; and
a second protocol processing part for Gigabit Ethernet,
wherein, if the instruction from said management console specifies protocol processing for the Fibre Channel, said interface processing unit directs said protocol processing unit to select said first protocol processing part and supplies a clock with 106.25 MHz to said serializer/deserializer circuit,
if the instruction from said management console specifies protocol processing for the Gigabit Ethernet, said interface processing unit directs said protocol processing unit to select said second protocol processing part and supplies a clock with 125 MHz to said serializer/deserializer circuit.

* * * * *